United States Patent [19]

Chan

[11] Patent Number: 4,537,375

[45] Date of Patent: Aug. 27, 1985

[54] METHOD AND APPARATUS FOR THRUSTER TRANSIENT CONTROL

[75] Inventor: Fred N. Chan, Atherton, Calif.

[73] Assignee: Ford Aerospace & Communications Corporation, Detroit, Mich.

[21] Appl. No.: 487,364

[22] Filed: Apr. 21, 1983

[51] Int. Cl.³ .............................................. B64G 1/26
[52] U.S. Cl. .................................. 244/171; 244/164; 244/169
[58] Field of Search .................. 244/158 R, 164, 169, 244/170, 171, 172; 364/434

[56] References Cited

U.S. PATENT DOCUMENTS

| | | | |
|---|---|---|---|
| Re. 30,429 | 11/1980 | Phillips | 244/169 |
| 3,330,503 | 7/1967 | Love et al. | 244/77 |
| 3,409,251 | 11/1968 | Lawson et al. | 244/77 |
| 3,490,719 | 1/1970 | Cantor et al. | 244/164 |
| 3,572,618 | 3/1971 | Willett | 244/77 |
| 3,624,367 | 11/1971 | Hamilton | 244/3.21 |
| 3,866,025 | 2/1975 | Cavanagh | 244/169 |
| 3,937,423 | 2/1976 | Johansen | 244/169 |
| 3,968,352 | 7/1976 | Andeen | 244/164 |
| 4,023,752 | 5/1977 | Pistiner et al. | 244/169 |
| 4,174,819 | 11/1979 | Bruderle et al. | 244/169 |
| 4,188,666 | 2/1980 | Legrand et al. | 364/434 |
| 4,325,124 | 4/1982 | Renner | 364/459 |

OTHER PUBLICATIONS

P. Brunet, "Compatibilite De La Stablisation H. Sat Avec Une Mission TV Directe", 12/25/78, Document No. 272/882.

Primary Examiner—Galen L. Barefoot
Assistant Examiner—Rodney Corl
Attorney, Agent, or Firm—Edward J. Radlo; Kenneth R. Allen; Robert D. Sanborn

[57] ABSTRACT

Transients and steady state error induced in maneuvering a satellite due to a disturbance torque caused by thrust mismatch or differential in the alignment of thrusters with respect to the center of mass are minimized by introducing a torque balancing bias at the input of a thrust modulator of the thrusters prior to sensing position or attitude error. The bias may instantly off-modulate the thruster control signal to cancel the effects of attitude transients before errors develop. Other axes thrusters may be on-modulated instantaneously to compensate for cross-axis torque. The bias may be introduced into the satellite control scheme by manual ground control or in automatic on-board compensation based on stored parameters obtained for example from calibration measurements. Specifically, the torque balancing bias may be developed by reference to thrust mismatch detected and stored during previous maneuvers, thus anticipating expected attitude error without actual detection thereof.

13 Claims, 5 Drawing Figures

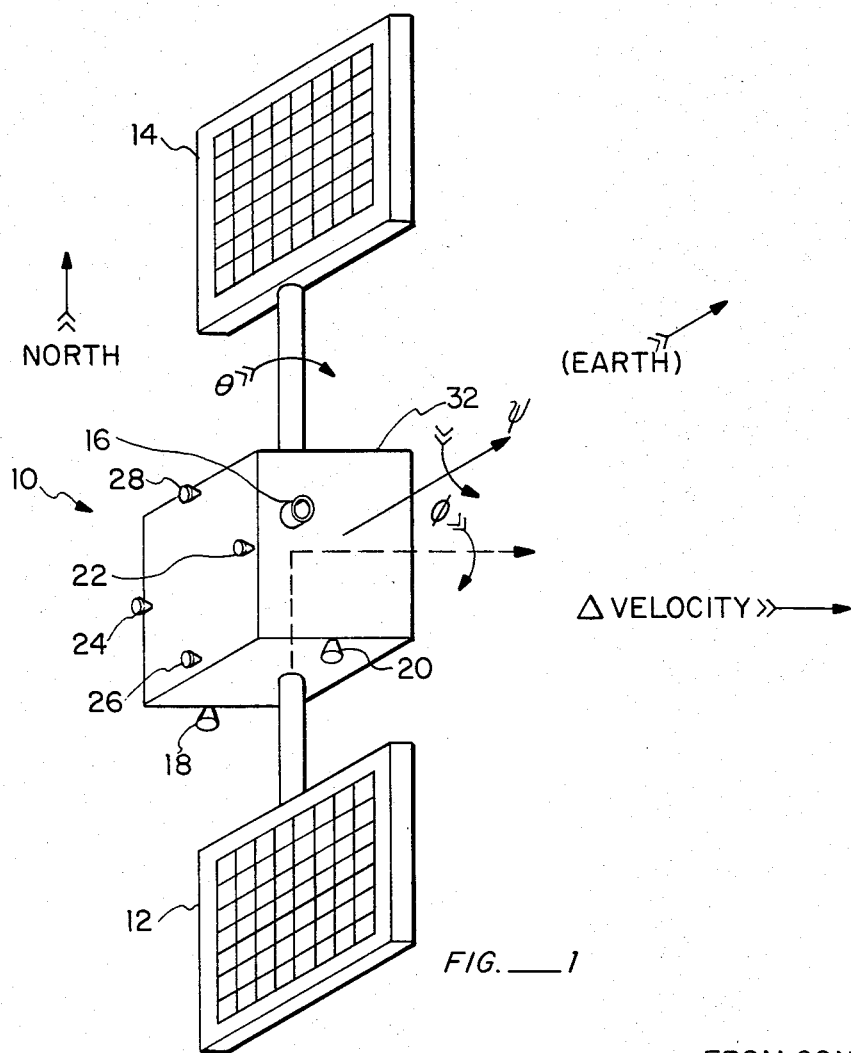
FIG._1
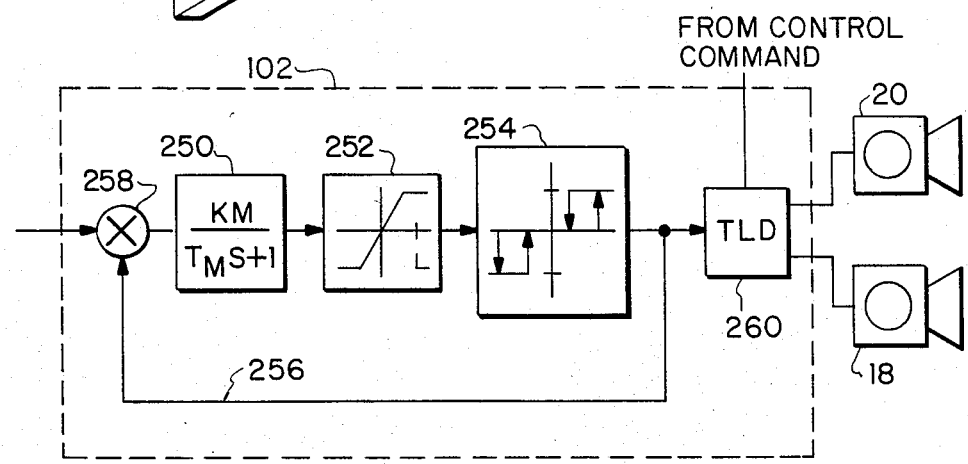
FIG._3

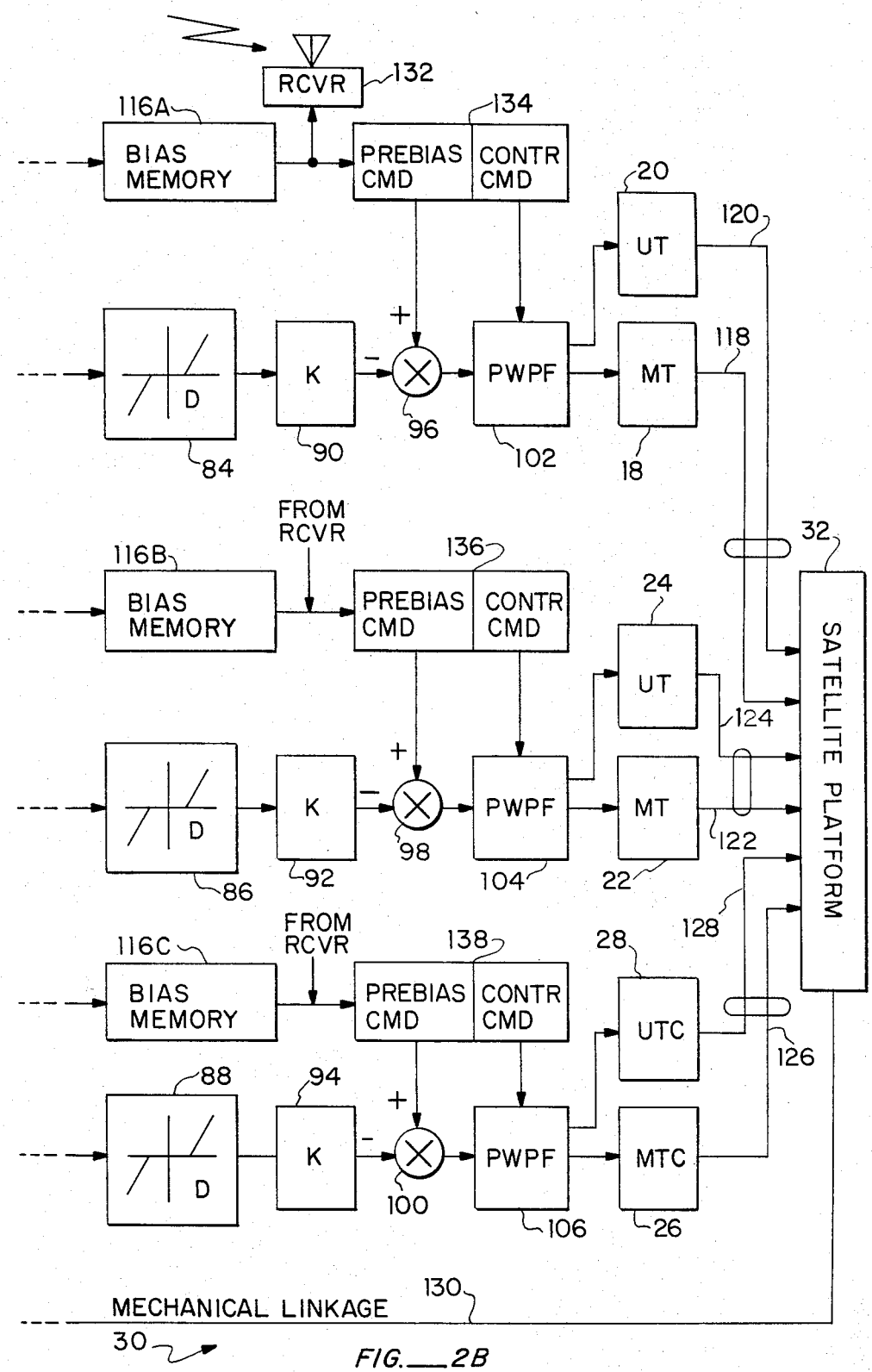
FIG._2B

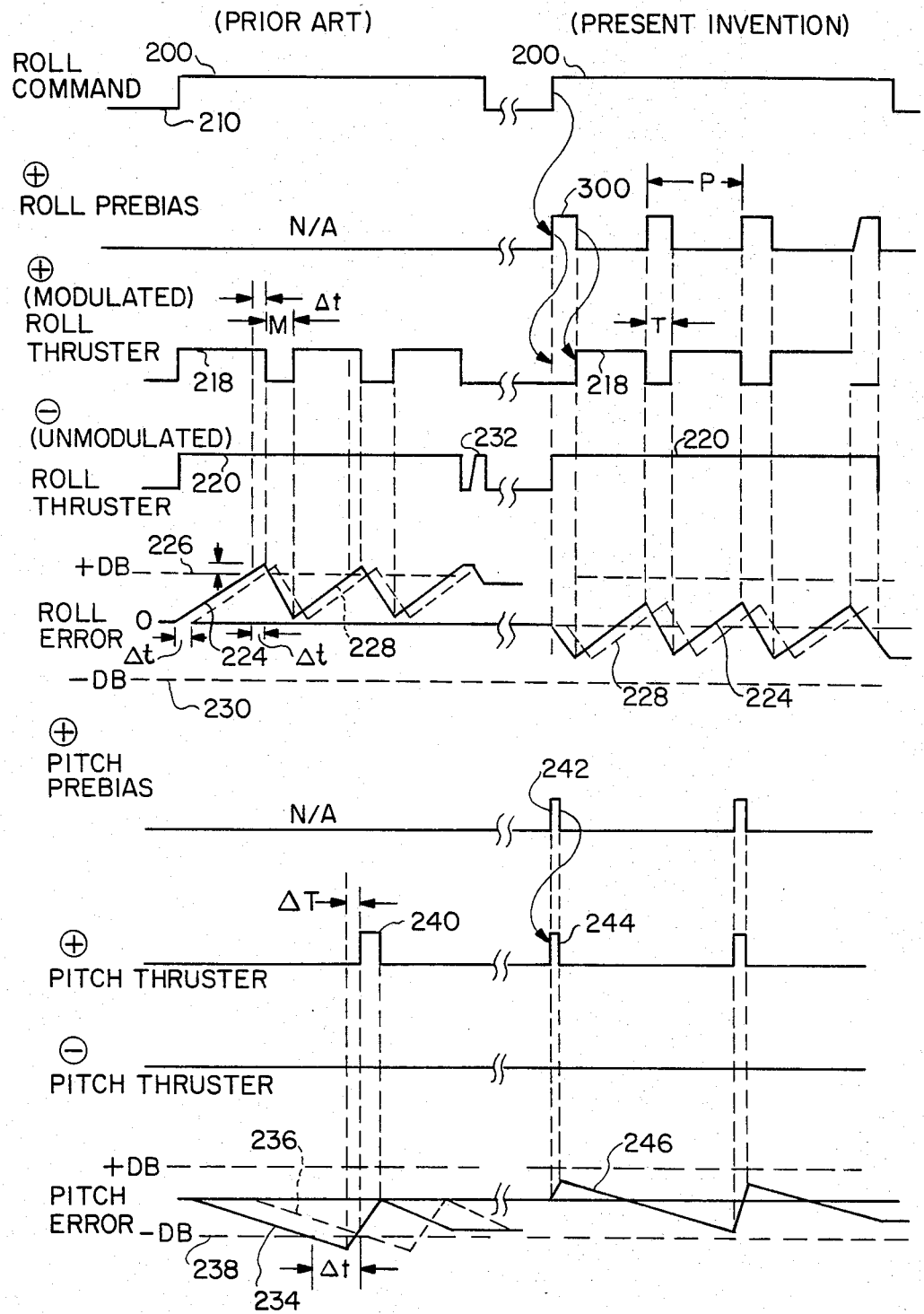
FIG._4

METHOD AND APPARATUS FOR THRUSTER TRANSIENT CONTROL

BACKGROUND OF THE INVENTION

1. Field of Invention

This invention relates to method and apparatus for spacecraft attitude control, and particularly to satellite transient attitude steady state attitude control during transfer orbit, stationkeeping, synchronous orbit and in general during any change in orbit velocity maneuver. In particular, the invention relates to thruster prebias control in order to compensate for imbalance and cross couplings due to misalignment among a plurality of attitude control thrusters of a spacecraft, such as a synchronous satellite during orbit adjustment.

Spacecraft, particularly satellites designed for geosynchronous orbit and having large structural arrays of solar panels, are particularly susceptible to structural oscillation due to the transient disturbances induced by small rocket engines known as thrusters. The transient disturbances cause not only structural oscillations but can cause undesirable changes in spacecraft attitude which affect antenna direction and, therefore, signal target and signal strength. The problem of spacecraft dynamics and disturbance torque is particularly acute during the orbit adjustment in the stationkeeping mode wherein the satellite attitude is controlled exclusively by gas thrusters.

2. Description Of The Prior Art

The closest known technique for the stabilization of a spacecraft to compensate for transients is described in a research study by Aerospatiale Cannes of France, entitled "COMPATIBILITE' DE LA STABILISATION H. SAT AVEC UNE MISSION TV DIRECTE", Document No. 272/882 A, dated Dec. 25, 1978 by P. Brunet. In this study, a technique was proposed wherein the attitude sensor of the satellite would be offset biased to compensate for the transients induced during the application of thrust. This technique presupposes that there will be attitude error induced which can be calibrated to thrust. However, such a technique is difficult to calibrate because of controller compensation delays. An inherently fast, i.e., wide bandwidth feedback loop would be required to render such a scheme functional. This has a number of inherent limitations and shortcomings such as susceptibility to nonlinearities of the thruster controller, substantial problems due to the uncertainties in the spacecraft dynamic parameters and undesired sensitivity to time delay and sensor phase lag.

The following further patents were uncovered in a search of the prior art:

U.S. Pat. No. 4,325,124 to Renner discloses a system for controlling the direction of the momentum vector of a geosynchronous satellite. The Renner system compensates for disturbance torques applied to a satellite in a way which eliminates the requirement for a thruster control loop. The disturbance torque is employed as a compensating torque to superimpose an artificial misalignment on the incidental misalignment of the satellite's solar panels. The artificial misalignment causes the momentum vector of the satellite to be adjusted to the desired direction to restore the desired attitude. The technique, involving correction which uses solar pressure to correct for solar pressure-induced, misalignment, should not be confused with the present invention.

U.S. Pat. No. 4,174,819 to Bruederle et al. describes a controller for attitude stabilization of a satellite in which the controller generates signals to thrusters and includes correction capabilities to permit efficient attitude control. Specifically, the system employs a two thruster pulse dead-beat mechanism to minimize spacecraft nutation.

U.S. Pat. No. 3,572,618 to Willett describes a method for stabilizing aircraft and missiles in which signals representative of the actual state of an airframe are generated by transducers and compared with a command signal fed to a control system whereby the state of the airframe is controlled. The technique involves modifying the sampling rate with respect to the bending mode of frequencies of sampled data systems.

U.S. Pat. No. 3,490,719 to Cantor et al. describes an attitude control system for providing reliable unidirectional transfer between a coarse mode and a fine mode of target acquisition.

U.S. Pat. No. Re. 30,429 to Phillips discloses a technique for minimizing spacecraft nutation due to disturbing torques. A signal responsive control system operates the attitude or orbit-control forces or a combination of both to minimize spacecraft nutation. In particular, the technique of two-pulse dead-beat control is extended to the use of reaction torque from reaction wheels.

U.S. Pat. No. 4,023,752 to Pistiner et al. discloses the elimination of residual spacecraft nutation due to repulsive torques. A signal responsive control system operates repulsive forces of a spacecraft for a predetermined time corresponding to an integral number of nutation periods in order to eliminate spacecraft nutation.

U.S. Pat. No. 3,937,423 to Johansen discloses nutation and roll-error-angle correction. The system employs two-pulse dead-beat thruster control which includes feedback correction paths by which jet triggering thresholds can be adjusted.

U.S. Pat. No. 4,188,666 to Legrand et al. describes a method and system for torque control and energy storage in a spacecraft. The system is operative to control inertia and reaction wheels to achieve a desired physical orientation and spacecraft activity. It is an object of this invention to minimize disturbance torques. In this system, it is stored kinetic energy which is regulated for controlling a momentum wheel and spacecraft attitude.

U.S. Pat. No. 3,968,352 to Andeen describes a torque control system using a closed tachometer loop to minimize wheel drag torque, bearing noise and the like and to derive an improved torque command for a wheel control system. The torque control system employs pulse-width modulation to control reaction wheels. An error signal derived from the difference between an integrated torque-command signal and angular speed signal is coupled to the motor of a reaction wheel to produce a compensated output torque referenced to disturbance torques.

U.S. Pat. No. 3,624,367 to Hamilton et al. discloses a self-optimized and adaptive attitude control system employing on-off reaction thrusters. Pulse-width modulation is determined by measuring angular velocities of the vehicle in order to minimize the number of propulsion system activations and thereby to prolong thruster life. Means are provided for introducing compensation for the presence of a bias force. The control system does not contemplate elimination of offset error but rather is concerned only with minimizing thruster activity.

U.S. Pat. No. 3,409,251 to Lawson et al. discloses a servo system including compensation for undesirable signals such as those produced by the misalignment, offset and long term drift bias of transducers and error signals in an aircraft.

U.S. Pat. No. 3,330,503 to Love et al. discloses a re-entry guidance system for use with a lifting vehicle entering a planet's atmosphere at high velocity. The system is employed to control aerodynamic control surfaces. During re-entry, a linear accelerometer generates an output which is compared to a precomputed nominal acceleration curve from which an error signal is generated which in turn is added to a command signal to insure that an appropriate amount of force is produced by the associated control surface.

SUMMARY OF THE INVENTION

According to the invention, a prebias is applied to thrusters in a three-axis stabilized control configuration to control spacecraft attitudes during those maneuvers which result in a change in velocity. Disturbance torque due to thrust level mismatch and misalignment of counteracting thrusters with respect to the center of mass is eliminated by prebias of pulse width modulation of pulse-width/pulse-frequency modulation bursts of thrusters during maneuvering. Substantially transient-free maneuvering is achieved by proper selection of the pulse-width differences of the selected thrusters prior to sensing position changes. The prebias is determined during a calibration mode, and sensed parameters are used to compute and store control parameters for subsequent use during maneuvering. Storage may be on board the satellite or at a remote ground station. The technique permits balancing of the amount of total net moment around the spacecraft during maneuvering without requiring real-time reference offset to spacecraft attitude.

The invention has particular advantage in that the feedback loop of the servo control system need have only relatively low gain while still accurately controlling spacecraft attitude. Moreover, low gain permits a relatively low control bandwidth which is not sensitive to loop time delay, to sensor phase lag, to nonlinearity of the pulse-width/pulse-frequency thrust system or to parameter uncertainty.

In a particular embodiment, a complex leadlag network with relatively long delay is included in the position control loop of a servo control system and a high pass function is included in the rate loop of the servo control system to provide damping of the control loop during a change in velocity maneuver.

The invention will be better understood by reference to the following detailed description taken in connection with the accompanying drawings.

BRIEF DESCRIPTION OF THE DRAWINGS

FIG. 1 is a simplified depiction of a spacecraft showing an arrangement of thrusters.

FIG. 2a and 2b is a block diagram of a three-axis thruster control of a spacecraft in accordance with the invention.

FIG. 3 is a block diagram of a portion of the control system according to the invention.

FIG. 4 is a waveform diagram for illustrating a command maneuver according to the invention and a command maneuver of the prior art.

DESCRIPTION OF SPECIFIC EMBODIMENTS

Figure 2A:
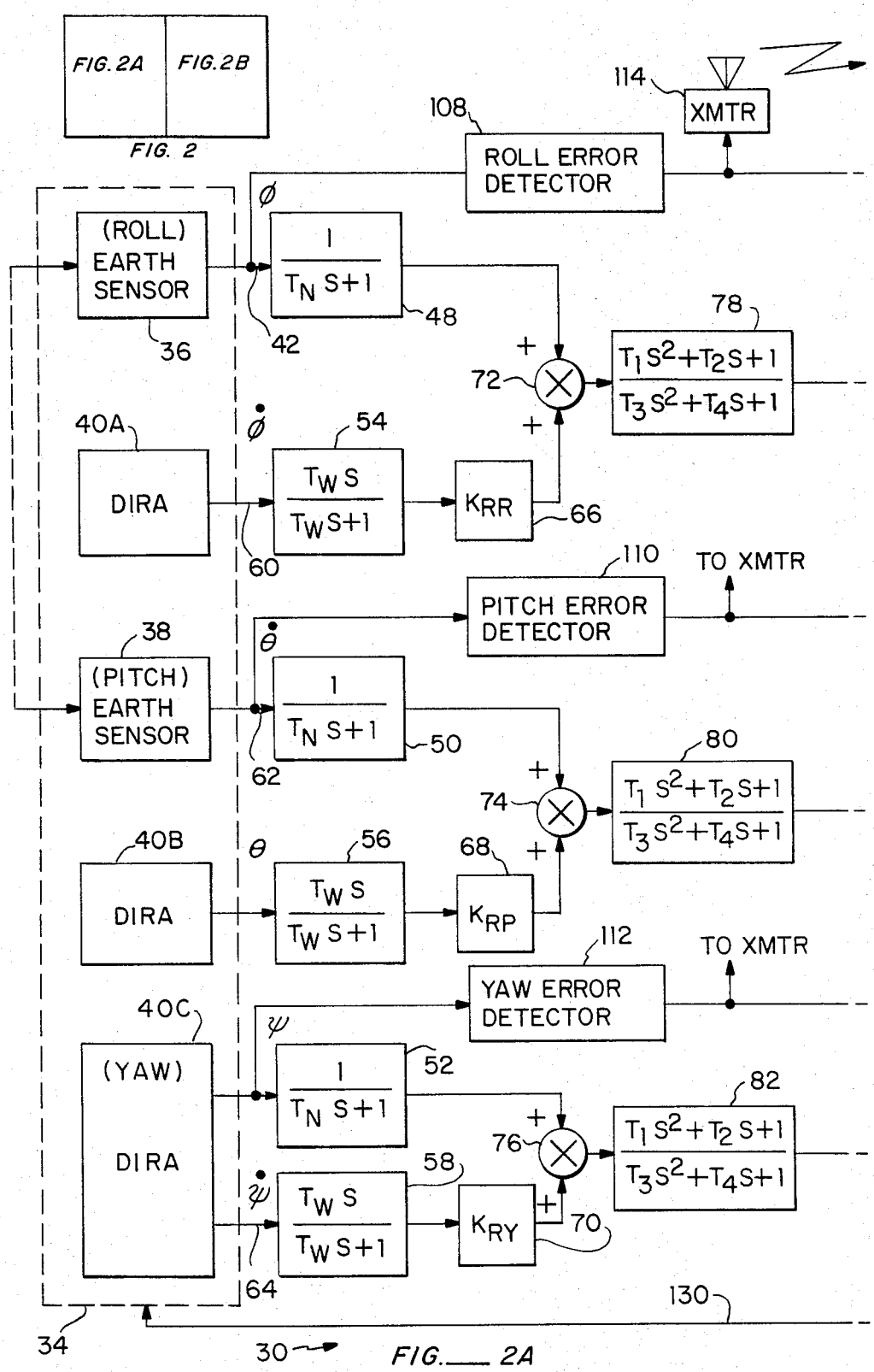

FIG. 1 illustrates the features of a typical spacecraft 10, such as a geosynchronous satellite having solar panels 12 and 14 disposed along the pitch axis $\theta$. In general, geosynchronous satellites are disposed with the pitch axis $\theta$ aligned with the North-South axis of the earth. The yaw axis $\psi$ is chosen to be in the direction of the earth. The roll axis $\phi$ is chosen to be along the tangent of the satellite orbit. For the purposes of later illustration, a change in velocity maneuver is effected along the roll axis $\phi$ in a westward direction for a geosynchronous satellite. The spacecraft 10 includes a position sensor 16, for example an earth position sensor pointed in the direction of the earth along the yaw axis $\psi$. The spacecraft 10 is provided with at least three pairs of thrusters, namely roll thrusters 18 and 20 disposed generally to rotate the spacecraft 10 around the roll axis $\phi$, pitch thrusters 22 and 24 disposed to effect primarily pitch attitude changes about the pitch axis $\theta$ and yaw thrusters 26 and 28 disposed to effect yaw changes about the yaw axis $\psi$. Ideally, in a stationkeeping maneuver wherein a change in velocity is to be effected without changing spacecraft attitude, the respective thrusters are fired in pairs with equal moment arms about the center of mass of the spacecraft 10 so as not to change spacecraft attitude. Such a maneuver is extremely difficult because of difficulty in controlling thrust, thrust dynamics and the location of the center of mass. It is for this purpose that the present invention was developed.

Turning to FIG. 2, there is shown a functional block diagram of an attitude servo control system 30 of the present invention for controlling the orientation of a satellite platform 32 to which is mounted a position and rate sensor assembly 34. The orientation and rate of change of the satellite platform 32 is effected by six force inputs, namely roll force inputs 118 and 120 from a first thruster, herein arbitrarily designated the modulated roll thruster (MT) 18 and a second thruster, herein arbitrarily designated the unmodulated roll thruster (UT) 20, pitch force inputs 122 and 124 from respective first and second or modulated pitch thruster 22 and unmodulated pitch thruster 24, and yaw force inputs 126 and 128 from respective first and second or modulated and unmodulated yaw thrusters 26 and 28. Mechanical linkage 130 couples the satellite platform 32 with the position and rate sensor assembly 34.

The position and rate sensor assembly 34 includes means for sensing position relative to the orientation of the satellite platform and means for sensing rate of change of attitude with reference to inertia of the satellite platform 32. Specifically, a roll earth sensor 36 and a pitch earth sensor 38 are operative to extract roll and pitch attitude coordinates by reference to the position of the earth in a field of view relative to the satellite platform 32. Rate of change in inertia is provided through a digital integrated rate gyro assembly (DIRA) comprising DIRA units 40A for roll, 40B for pitch and 40C for yaw.

The earth sensors 36 and 38 form position loops with respect to movement of the satellite platform 32. The DIRAs 40A, 40B, and 40C form rate loops with respect to the change of position of the satellite platform 32. Each of these rate loops and position loops have associated therewith time constants relating to the propagation of feedback signals governing the modulation control of the modulated thrusters 18, 22 and 26. Because of the sensitivity of the satellite platform 32 to thrust inputs, the time constants would have to be minimized and the gain of the servo loops would have to be maximized if substantially real-time position and rate feedback were to be provided to control the modulation of the modulated thrusters 18, 22 and 26. However, suitable wideband servo control loops are extremely difficult to achieve because of the natural dynamics of the spacecraft and because of other factors. Attempts to provide such wideband, high gain control typically fail because the dynamics of the spacecraft render the spacecraft susceptible to instabilities such as undesired mechanical oscillation. Therefore, according to the invention, the position error signals, as for example, the signals on roll position error signal line 42 and yaw position error signal line 46 are extracted and stored during a calibration maneuver. They are subsequently employed during a change in velocity maneuver to generate a prebias command directed into the modulation control system of the thrusters thereby to overcome the time delay associated with real-time generation of initial position error signals. Specifically, according to the invention, the change in attitude of the satellite platform 32 which has been effected by input of force by selected counteracting force input pairs under unmodulated conditions is measured during a calibration maneuver and a position error signal thereby generated is used for force calibration. The force calibration factor is applied as a prebias command bypassing the servo loop time delay associated with the position sensor.

The operation of the invention will be better understood by reference to a specific embodiment, as shown in FIG. 2, and by reference to the timing diagrams of FIG. 4. Referring first to FIG. 2, each servo loop, namely the roll, pitch and yaw channels, which are ideally orthogonal, includes a lowpass filter section 48, 50 and 52 respectively, in the position loop and a highpass filter 54, 56 and 58 in the rate loop. These filters are designed to minimize the noise introduced into the loops as a nature of the sensed error signals, namely the position error signals on signal lines 42, 44 and 46 and the rate error signals on roll rate error signal line 60, pitch rate error signal line 62 and yaw rate error signal line 64. Also associated with each highpass filter in the rate loop is a rate amplifier 66, 68, 70 having associated therewith respective rate gains $K_{RR}$ for roll rate gain, $K_{RP}$ for pitch rate gain and $K_{RY}$ for yaw rate gain. Filtered position signals and rate signals are fed to respective summers 72, 74, 76, the outputs of which are each coupled to a second order compensation network 78, 80, 82. The compensation network 78, 80, 82 of each channel provides complex lead-lag compensation tailored to the characteristics of each of the three consolidated servo loops. While these compensation networks 78, 80 and 82 provide desirable servo loop control characteristics, they also introduce a relatively long delay between the error sensing mechanisms and the control mechanisms of the servo loop. In addition, a nonlinear deadband element 84, 86 and 88 is provided in each of the servo loops to take into account the acceptable limits of steady state attitude error. Otherwise, an inordinate amount of thruster fuel would be wasted while the servo system attempted to maintain attitude within a zero deadband.

Common loop gain is represented by servo amplifier elements 90, 92 and 94, the output of which is fed in negative feedback to respective command summers 96, 98 and 100. The output of the command summers 96, 98 and 100 is applied to respective pulse-width, pulse frequency modulating devices (PWPF) 102, 104, 106, the paired outputs of which each control respective modulated thrusters 18, 22 and 26 and counteracting unmodulated thruster 20, 24 and 28. The function of the PWPF 102, 104, 106 will be explained hereinafter.

Associated with each control channel is an off-line feedforward channel which includes a roll error detector 108 in the roll channel, a pitch error detector 110 in the pitch channel and a yaw error detector 112 in the yaw channel. The respective error detectors 108, 110, 112 are operative to detect position error induced during start-up operation of the thruster pairs in a calibration maneuver. The respective errors are conveyed by a transmitter 114 to a ground station (not shown) or to storage in an on-board bias memory 116A, 116B, 116C wherein the error induced during each maneuver can be recorded for future reference and use. For example, roll force inputs 118, 120 can induce a change in attitude of the satellite platform 32 affecting most strongly the roll motion of the spacecraft while to a lesser degree pitch and yaw. The errors associated with the roll, pitch and yaw signals can be transmitted to a ground control station (not shown) for subsequent input as roll, pitch and yaw prebias commands during activation of the roll thrusters 18 and 20 in a change of velocity maneuver. Similarly, memory locations in the bias memory 116A, 116B, 116C can be set aside for storing the primary and crosstalk errors induced during maneuvers involving the other thrusters.

Signals representing the prebias can be extracted from the bias memory 116A, 116B, 116C or received through a receiver 132 and provided to a command module 134, 136, 138 for each channel. The command modules 134, 136, 138 generate the prebias commands to the summers 96, 98, 100 and any associated control commands to the PWPF 102, 104, 106 which in turn control the relative modulation of the paired thrusters.

Referring to FIG. 4, there is shown in comparison timing diagrams of control functions of the prior art (left column) and of the present invention (right column). FIG. 4 illustrates phenomena related to attitude control of two axes arbitrarily designated roll and pitch. Attitude phenomena related to the third axis, namely yaw are not shown, as such phenomena are adequately illustrated by the phenomena related to the pitch axis. Specifically, there are two types of phenomena, namely, off-modulation of an active thruster during the firing of a thruster pair and on-modulation of an inactive thruster during firing of a thruster pair along an axis orthogonal to the inactive thruster.

For the purposes of explanation, a roll command maneuver is illustrated. A roll command is initiated, typically from a ground station, as illustrated by a continuous roll maneuver command signal 200 following an off signal 210. Roll maneuver command signal 200 activates a thruster pair, such as the modulated roll thruster 18 and the unmodulated roll thruster 20 of FIG. 2. The output of the unmodulated roll thruster 20 is represented by a signal 220, and the output of the modulated roll thruster 18 is illustrated by a signal 218. Because of thrust imbalances as between the modulated roll thruster and the unmodulated roll thruster, a roll error 224 is developed. The roll error eventually encounters one deadband threshold 226. However, there is an inherent delay $\Delta T$ associated with the servo loop due to time delays between the actual change in attitude and the signal responsive to the sensor. The delayed roll error signal 228 activates the PWPF 102 to off-modulate the modulated roll thruster signal 218 for a period M beginning at a time $\Delta T$ following the crossover by the roll error 224 of the deadband threshold 226. Hence, thruster 18 is designated the modulated thruster. The off-modulation period is shown in signal 218. For the interval M of signal 218, the unmodulated roll thruster 20 is active, as shown by signal 220, thereby causing a rapid reversal in attitude drift as illustrated by the roll error 224 during the corresponding interval. The length of the off-modulation period may be preset at an arbitrary figure intended to keep the roll error 224 within the deadband between first threshold 226 and second threshold 230. Nevertheless, due to the inherent bias or imbalance between the modulated and unmodulated roll thrusters while firing, the roll error 224 at the termination of a roll command may well be outside the permitted thresholds and may well cause subsequent roll thruster corrective maneuvers since the roll error signal 228 lags actual roll error 224. A post command pulse 232 of the unmodulated roll thruster signal 220 may therefore be generated in the servo loop to correct the roll error 224.

During a roll maneuver, the pitch attitude (and also the yaw attitude) may be effected by cross axis moment forces inducing a pitch error 234 followed by a pitch error signal 236 delayed by a loop delay $\Delta T$. As the pitch error signal 236 encounters the deadband threshold 238, a signal is generated which activates the appropriate pitch thruster, as represented by pitch thruster signal 240. The pitch thruster is active for a predetermined period sufficient to bring the pitch error back within deadband. Thus has the attitude control system of the prior art operated.

In the right column of FIG. 4 are shown phenomena of the present invention. A roll command 200 is actuated under external control and, according to the invention, a roll prebias 300 representing the ratio of disturbance torque to control torque is immediately initiated by a prebias command without reference to the roll error signal 228. The roll prebias command is activated to initiate an automatic closed-loop selection of period P and off modulation interval T in the PWPF 102 during the roll command maneuver. The activated signal induces off-modulation periods in the modulated roll thruster signal 218 which are substantially independent of the initial roll error signal 228 with its inherent time delay following the actual roll error 224. The period P and the interval T initiated by the roll prebias command is closed-loop selected within the PWPF 102. The duration and frequency of the roll prebias 300 is selected to emulate the off-modulation pattern of the modulated roll thruster in the neighborhood of the deadband 226. This technique provides a remarkably accurate method for controlling roll error without the inherent delay of a closed-loop system.

Whereas a prebias command may be used to off-modulate an activated roll thruster, a prebias command applied to normally nonactive roll thrusters can also be used to on-modulate according to the same technique. For example, a pitch prebias command 242 is operative to trigger a pitch thruster, as evidenced by a pitch thruster signal 244 to correct for pitch error 246. The pitch error 246 remains within the limits of the deadband. The on-modulation of the pitch thruster to control pitch error 246 within the deadband is independent of initial pitch attitude. On the other hand, the attitude control loop is activated to maintain the pitch error 246 or roll error 242 inside the deadband. Prototype testing has indicated that a proper prebias command will maintain attitudes control well within the boundaries of the deadband.

Referring to FIG. 3, there is shown one embodiment of a PWPF 102 according to the invention coupled to an unmodulated thruster 20 and a modulated thruster 18. The PWPF 102 comprises a servo loop having a lowpass filter 250 coupled through a limiter 252 which in turn is coupled through a hysteresis controller 254, the output of which is fed back through a feedback line 256 in negative feedback to a summing junction 258. Control input into the summing junction 258 is provided from the summer 96 (FIG. 2). Table 1 sets forth the parameters for two different minimum duration command control pulses generated by the PWPF 102, the parameters being $K_M$ and $T_M$ of the lowpass filter 250, parameter L of the limiter 252 and parameters $U_{ON}$, $U_{OFF}$ and $U_M$ of the hysteresis controller 254.

TABLE 1

| PARAMETER | MIN. PULSE | |
|---|---|---|
| PWPF | 16 msec | 32 msec |
| $T_M$ | 0.13 | 0.21 |
| $K_M$ | 4.50 | 10.00 |
| $U_{ON}$ | 0.45 | 1.00 |
| $U_{OFF}$ | 0.15 | −0.14 |
| $U_M$ | 1.00 | 1.00 |
| L | 0.54 | 1.20 |

The output of the hysteresis controller 254 is applied to a thruster logic detector 260, the function of which is to either on-modulate or off-modulate the thrusters depending on the activity states applied to the PWPF 102. The thruster logic detector 260 is responsive to control command input signals indicating whether the thruster pair should be activated or inactive, and it is responsive to three possible states of the hysteresis controller 254, namely positive error, negative error and zero error. Table 2 illustrates the input states and the possible output states of the thruster logic detector 260.

TABLE 2

| CONTROL COMMAND 1/0 | ERR +/−/0 | THRUSTER (−) | THRUSTER (+) |
|---|---|---|---|
| 0 | 0 | 0 | 0 |
| 0 | + | 1 | 0 |
| 0 | − | 0 | 1 |
| 1 | 0 | 1 | 1 |
| 1 | + | 1 | 0 |
| 1 | − | 0 | 1 |

There are six possible states. In the first state, in the absence of a control command to activate the thruster pairs and in the absence of any detected error, the thrusters, namely, a negative thruster and a positive thruster, are both inactive. In the absence of a control command to activate the thruster pair and in the presence of a positive error detected through the PWPF 102, the negative thruster is activated. In the absence of a control command to activate the thruster pairs and in the presence of a negative detected error, the positive thruster is activated. In the presence of a control command and in the absence of error, both the positive and the negative thrusters are activated. In the presence of a control command and a positive error, the negative thruster is activated and the positive thruster is off-modulated. In the presence of a control command and a negative error, the negative thruster is off-modulated and the positive thruster is on-modulated.

The invention has now been explained with reference to specific embodiments. Other embodiments will be apparent to those of ordinary skill in the art. It is therefore not intended that this invention be limited except as indicated by the appended claims.

I claim:

1. For use in a spacecraft during a change in velocity maneuver, the spacecraft employing a plurality of thrusters, at least a first thruster and a second thruster being disposed to develop mutually counteractive moment arms of thrust relative to at least one axis through a center of mass of the spacecraft, said first thruster and said second thruster being capable of developing unequal moment arms of force, a method for counteracting disturbance transients comprising the steps of:

storing prior to said manuever a value representative of an estimated disturbance torque; thereafter modulating in response to said stored value one of said first and second thrusters during said maneuver to counteract an actual disturbance torque a sufficient amount to compensate for said actual disturbance torque in order to minimize a net position error without initially detecting said net position error; thereafter detecting said net position error, said net position error being indicative of a difference between said estimated disturbance torque and said actual disturbance torque with respect to said axis; and thereafter modulating in response to a sum of said stored value and said net position error one of said first and second thrusters during said manuever to counteract said actual disturbance torque to further minimize said net position error.

2. The method according to claim 1 wherein said modulating step comprises off-modulating one of said thrusters at an initial time in said maneuver to minimize transient net position error during initial periods of said manuever.

3. The method according to claim 1 wherein said spacecraft includes at least a first thruster and a second counteracting thruster associated with each of a first axis, a second axis and a third axis, said first axis, said second axis and said third axis being orthogonal to one another, wherein said detecting step comprises measuring net position error indicative of net disturbance torque with respect to each one of said first axis, said second and said third axis, and wherein said modulating steps comprise applying a counteracting torque by either on-modulating an off thruster or off-modulating an on thruster during said maneuver.

4. The method according to claim 2 wherein said spacecraft includes at least a first thruster and a second counteracting thruster associated with each of a first axis, a second axis and a third axis, said first axis, said second axis and said third axis being orthogonal to one another, wherein said detecting step comprises measuring said net position error indicative of net disturbance torque with respect to each one of said first axis, said second axis and said third axis, wherein said storing step includes storing at least one value representative of said estimated net disturbanee torque with respect to each one of said first axis, said second and said third axis, and wherein said modulating steps comprise applying a counteracting torque by either on-modulating an off thruster or off-modulating an on thruster during said maneuver.

5. For use in a spacecraft during a change in velocity maneuver, the spacecraft comprising a plurality of thrusters, at least a first thruster and a second thruster being disposed to develop mutually counteractive moment arms of thrust relative to at least one axis through a center of mass of said spacecraft, said first thruster and said second thruster being capable of developing unequal thrust, an apparatus for independently modulating thruster discharge for counteracting disturbance transients comprising:

means for generating a value representative of an estimated net disturbance torque for storage prior to said manuever;

means for modulating one of said first and second thrusters in response to said estimated disturbance torque value obtained following storae during said maneuver to counteract an actual disturbance torque a sufficient amount to compensate for said actual disturbance torque in order to minimize a net position error without initially detecting said net position error;

means for combining said net position error and said estimated disturbance torque value to produce a control value for controlling said modulating means during said maneuver; and means for detecting said net position error, said net position error being indicative of a difference between said estimated disturbance and said actual disturbance torque with respect to said one axis.

6. The apparatus according to claim 5 wherein said modulating means includes means for off-modulating an on thruster and means for on-modulating an off thruster, said modulating means being coupled to receive a stored value in the form of a prebias command.

7. The apparatus according to claim 6 further including means for storing said value representative of said net disturbance torque.

8. The apparatus according to claim 5 wherein said means for generating said value for storage includes a storage means and wherein said generated value is stored aboard said spacecraft.

9. The apparatus according to claim 5 wherein said detecting means is included within a control loop including means for damping said control loop during a change in velocity maneuver.

10. The apparatus according to claim 5 wherein said spacecraft includes at least a first thruster, a second counteracting thruster associated with each one of a first axis, a second axis and a third axis, said first axis, second second axis and said third axis being orthogonal to one another and wherein said detecting means includes means for measuring net position error to generate a difference value indicative of said difference between said estimated disturbance torque and said actual disturbance torque with respect to each of said first axis, said second axis and said third axis and said modulating means comprises means for applying a counteracting torque thrust in response to said control value with respect to a corresponding axis.

11. The apparatus according to claim 9 wherein said spacecraft includes at least a first thruster, a second counteracting thruster associated with each one of a first axis, a second axis and a third axis, said first axis, said second axis and said third axis being orthogonal to one another and wherein said detecting means includes means for measuring net position error to generate a difference value indicative of said difference between said estimated disturbance torque and said actual disturbance torque with respect to each of said first axis, said second axis and said third axis and said modulating means comprises means for applying a counteracting torque thrust in response to said control value with respect to a corresponding axis.

12. The apparatus according to claim 8 wherein said spacecraft includes at least a first thruster, a second counteracting thruster associated with each one of a first axis, a second axis and a third axis, said first axis, said second axis and said third axis being orthogonal to one another and wherein said detecting means includes means for measuring net position error to generate a difference value indicative of said difference between said estimated disturbance torque and said actual disturbance torque with respect to each of said first axis, said second axis and said third axis and said modulating means comprises means for applying a counteracting torque thrust in response to said control value with respect to a corresponding axis.

13. The apparatus according to claim 7 wherein said spacecraft includes at least a first thruster, a second counteracting thruster associated with each one of a first axis, a second axis and a third axis, said first axis, said second axis and said third axis being orthogonal to one another and wherein said detecting means includes means for measuring net position error to generate a difference value indicative of said difference between said estimated disturbance torque and said actual disturbance torque with respect to each of said first axis, said second axis and said third axis and said modulating means comprises means for applying a counteracting torque thrust in response to said control value with respect to a corresponding axis.

\* \* \* \* \*

US004537375C1

(12) EX PARTE REEXAMINATION CERTIFICATE (5903rd)
United States Patent
Chan

(10) Number: US 4,537,375 C1
(45) Certificate Issued: Oct. 2, 2007

(54) METHOD AND APPARATUS FOR THRUSTER TRANSIENT CONTROL

(75) Inventor: Fred N. Chan, Atherton, CA (US)

(73) Assignee: Space Systems/Loral, Inc., Palo Alto, CA (US)

Reexamination Request:
No. 90/007,675, Aug. 15, 2005

Reexamination Certificate for:
Patent No.: 4,537,375
Issued: Aug. 27, 1985
Appl. No.: 06/487,364
Filed: Apr. 21, 1983

(51) Int. Cl.
*G05D 1/08* (2006.01)
*B64G 1/26* (2006.01)
*B64G 1/24* (2006.01)

(52) U.S. Cl. .................. 244/171; 244/164; 244/169
(58) Field of Classification Search .................. None
See application file for complete search history.

(56) References Cited

U.S. PATENT DOCUMENTS 4,567,564 A  1/1986  Bittner et al.

OTHER PUBLICATIONS

"Automatic Control In Space 1982" Edited by P. TH. L.M. Van Woerkom; Design Of Reaction Jet Attitude Control Systems For Flexible Spacecraft by H. Bittner, H.D. Fischer and M. Surauer, Proceedings of the Ninth IFAC/ESA Symposium Noordwijkerhout, The Netherlands Jul. 5–9, 1982; National Aerospace Laboratory NLR, The Netherlands; Published for the International Federation Of Automatic Control by Pergamon Press; Messerschmitt Bolkow Blohm GmbH, Space Division, 8012 Ottobrunn, Federal Republic of Germany; pp. 373–398; © 1983.
"Automatic Control In Space" Editor C.W. Munday; Three–Axis Stabilization Of Communication Satellites. Past Experience With Symphonie And Application In Follow–On Projects by W. Goschel, H. Bittner, A. Brauch and E. Bruderle, Proceedings of the $8^{th}$ IFAC Symposium, Oxford, England, Jul. 2–6, 1979; Published for the International Federation Of Automatic Control by Pergamon Press; Space Division, Messerschmitt–Bolkow Blohm GmbH, Munchen–Ottobrunn, Federal Republic of Germany; pp. 443–463.

*Primary Examiner*—Peter C. English

(57) ABSTRACT

Transients and steady state error induced in maneuvering a satellite due to a disturbance torque caused by thrust mismatch or differential in the alignment of thrusters with respect to the center of mass are minimized by introducing a torque balancing bias at the input of a thrust modulator of the thrusters prior to sensing position or attitude error. The bias may instantly off-modulate the thruster control signal to cancel the effects of attitude transients before errors develop. Other axes thrusters may be on-modulated instantaneously to compensate for cross-axis torque. The bias may be introduced into the satellite control scheme by manual ground control or in automatic on-board compensation based on stored parameters obtained for example from calibration measurements. Specifically, the torque balancing bias may be developed by reference to thrust mismatch detected and stored during previous maneuvers, thus anticipating expected attitude error without actual detection thereof.

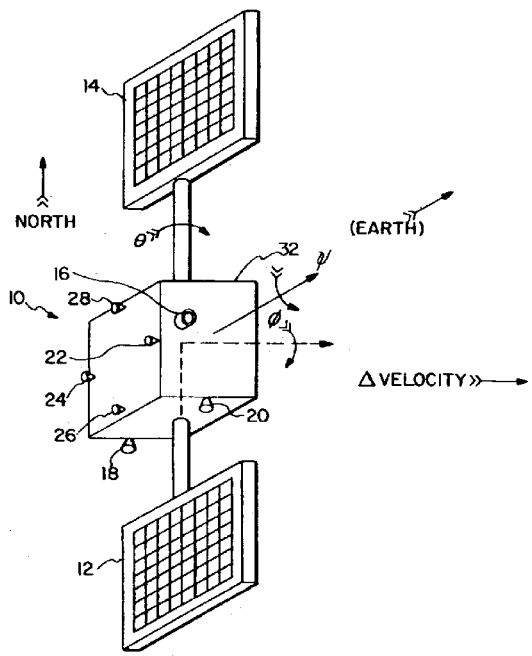

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–13 are cancelled.

\* \* \* \* \*